United States Patent [19]

Espelage et al.

[11] 4,426,611
[45] Jan. 17, 1984

[54] TWELVE PULSE LOAD COMMUTATED INVERTER DRIVE SYSTEM

[75] Inventors: Paul M. Espelage, Salem, Va.; David L. Lippitt, Scotia; Leland C. Tupper, Schenectady, both of N.Y.

[73] Assignee: General Electric Company, Salem, Va.

[21] Appl. No.: 372,749

[22] Filed: Apr. 28, 1982

[51] Int. Cl.³ .............................................. H02P 5/34
[52] U.S. Cl. ..................... 318/803; 318/798; 363/71; 363/65
[58] Field of Search ............... 363/71, 65, 137, 37; 318/809, 803, 800–802, 810, 798–799, 804–806, 807, 808, 732, 832; 307/58

[56] References Cited

U.S. PATENT DOCUMENTS

| | | | |
|---|---|---|---|
| 3,549,977 | 12/1970 | Watkins | 363/71 |
| 3,601,674 | 8/1971 | Joslyn et al. | 318/318 |
| 3,621,365 | 11/1971 | Beck | 307/58 X |
| 3,718,851 | 2/1973 | Graf | 318/806 X |
| 3,781,615 | 12/1973 | Mokrytzki | 318/801 |
| 3,979,662 | 9/1976 | Klein | 363/71 |
| 4,090,116 | 5/1978 | Lippitt | 318/345 |
| 4,158,801 | 6/1979 | Hirata | 318/809 X |
| 4,230,979 | 10/1980 | Espelage et al. | 318/721 |
| 4,237,531 | 12/1980 | Cutler | 363/37 X |
| 4,263,557 | 4/1981 | Jarvinen | 318/341 |
| 4,268,900 | 5/1981 | Hirata | 363/71 |
| 4,276,505 | 3/1980 | Bose | 318/723 |
| 4,276,590 | 6/1981 | Hansel | 363/71 |
| 4,311,951 | 1/1982 | Walker | 318/803 X |
| 4,326,156 | 4/1982 | Herbert | 318/809 |
| 4,349,772 | 12/1980 | Weiss | |

Primary Examiner—J. V. Truhe
Assistant Examiner—Patrick Keane
Attorney, Agent, or Firm—Arnold E. Renner; Ormand R. Austin

[57] ABSTRACT

A control system for powering an AC load such as a polyphase synchronous motor having at least two sets of three phase (3φ) windings. Each three phase winding set is powered by an independently operable six pulse load commutated inverter drive including a source side converter and a load side converter coupled together by means of a DC link and wherein the source side converter and the load side converter are operated in accordance with respective current and load angle regulators which respond to torque command signals generated by speed regulators. The two motor drives operate concurrently in separate control channels which are substantially independent of one another with the exception that in one embodiment, which is the preferred embodiment, the speed regulator and the motor terminal overvoltage regulator are cross-coupled to effect a balanced torque command and motor terminal voltage from each channel while still providing for continued motor operation by one of the motor drive channels in the event that the other becomes inoperative for any reason. In a second embodiment, one of two redundant speed regulators is adapted to provide a common torque command to both channels with the other speed regulator taking over in the event of the failure of said one speed regulator.

24 Claims, 5 Drawing Figures

TWELVE PULSE LOAD COMMUTATED INVERTER DRIVE SYSTEM

REFERENCED MATERIAL

Reference is made to a microfiche appendix which sets forth a computer program listing including that which is applicable to the present invention. Included are 8 microfiche containing a total of 458 frames.

CROSS REFERENCE TO RELATED APPLICATIONS

This application is related to the following applications which are assigned to the assignee of the present invention and which are herein meant to be incorporated by reference:

U.S Ser. No. 300,200, entitled, "Line-to-Line Voltage Reconstruction For Synchronizing Thyristor Power Converter", filed on Sept. 8, 1981 in the name of Paul M. Espelage;

U.S. Ser. No. 333,933, entitled, "Flux Feedback Firing Control For A Load Commutated Inverter", filed on Dec. 23, 1981, in the names of David L. Lippitt, et al.;

U.S. Ser. No. 333,928, entitled, "Cross-Tied Current Regulator For Load Commutated Inverter Drives", filed on Dec. 23, 1981 in the names of John D. D'Atre, et al.;

U.S. Ser. No. 322,741, entitled, "Terminal Voltage Limit Regulator For A Load Commutated Inverter", filed on Nov. 19, 1981 in the name of Leland C. Tupper;

U.S. Ser. No. 343,916, entitled, "Current Limiter For A Load Commutated Inverter", filed on Jan. 29, 1982 in the name of Leland C. Tupper; and U.S. Ser. No 364,453, entitled, "Transitioning Between Multiple Modes Of Inverter Control In A Load Commutated Inverter Motor Drive", filed on Apr. 1, 1982 in the name of B. Paul Chausse, et al.

BACKGROUND OF THE INVENTION

This invention relates generally to firing circuits for thyristor power conversion systems and more particularly to an improved means for controlling the operation of a load commutated inverter AC motor drive system including a polyphase synchronous motor supplied from a polyphase alternating current source.

Many circuits and systems are known for controlling the conductivity of controlled rectifiers utilized in various types of converters for supplying electrical power to a load such as an AC motor from a polyphase alternating current (AC) source. The type of rectifier used controls, to some degree, the type of control utilized but by far the most common controlled rectifier used in practice today is a thyristor of the silicon controlled rectifier (SCR) type which becomes conductive with the simultaneous application of a forward bias voltage and a signal applied to its gate electrode and which thereafter remains conductive until the anode current falls below the value required to hold the thyristor in its conductive state.

Whereas motor control systems employing thyristors have been implemented in the past using analog control techniques, a typical example being U.S. Pat. No. 4,230,979, entitled, "Control Current Inverter And Motor Control System", issued to Paul M. Espelage, et al. on Oct. 28, 1980, attention has also been and is presently being directed to digital types of control techniques, examples of which are disclosed in: U.S. Pat. No. 3,601,674, entitled, "Control System For Firing SCR's In Power Conversion Apparatus", John A. Joslyn, et al. which issued on Aug. 24, 1971; U.S. Pat. No. 4,263,557, entitled, "Power Converter Control", which issued to Willard B. Jarvinen on Apr. 21, 1981; and U.S. Pat. No. 4,276,505, entitled, "Microcomputer Based Control Apparatus For A Load Commutated Inverter Synchronous Machine Drive System", which issued to Bimal K. Bose on June 30, 1981. The teachings of these patents are also intended to be incorporated by reference.

In the aforementioned related applications, there are disclosed various improvements in a load commutated inverter motor drive system, the concepts of which are also included in the present invention, as will become evident when the following detailed description is considered.

In any phase control system utilizing a thyristor bridge converter, whether it be an analog or digital type system, the AC terminal voltage is a prime feedback signal employed to control the conductivity of the various thyristors. Typically, the AC phase voltages, referred to a fictitious neutral, are utilized to develop line-to-line terminal voltages from which synchronizing signals are generated from pseudo-flux waveforms obtained by integrating the line-to-line voltages. These pseudo-flux waveforms are used to control both the fixed frequency source side converter and the variable frequency load side converter. In an AC motor drive system utilizing this type of control, there is also a requirement of speed regulation and control in the presence of variable load torques. Moreover, the basic control parameters available are limited to the choice of firing times for the thyristor cells making up the source side and load side converters and accordingly the normal mode of control is to fire the load side converter cells in a manner to provide maximum power factor in the motor while firing the source side converter cells to give the voltage necessary to maintain the current required to generate the necessary torque.

SUMMARY OF THE INVENTION

It is, therefore, an object of the present invention to provide an improved system for the control of an AC polyphase motor drive system.

It is a further object to provide an improved system for controlling a load commutated inverter synchronous motor drive system.

It is still a further object of the present invention to provide a twelve pulse load commutated inverter synchronous motor drive system.

The foregoing and other objects are achieved by a control system for powering an AC load such as a polyphase synchronous motor and, more particularly to such a motor having at least two sets of three phase (3φ) windings where the winding sets are mutually displaced by 60 electrical degrees divided by the number of three phase winding sets. Thus for two sets, the displacement will be 30 electrical degrees. Each three phase winding set is powered by an independently operable six pulse load commutated inverter drive including a source side converter and a load side converter coupled together by means of a DC link and wherein the source side converter and the load side converter are operated in accordance with respective current and load angle regulators which respond to torque command signals generated by speed regulators. The two motor drives operate concurrently in separate control channels which are substantially independent of one another with the exception that in one embodiment, which is the preferred embodiment, the speed regulator and the motor terminal overvoltage regulator are cross-coupled to effect a balanced torque command and motor terminal voltage from each channel while still providing for continued motor operation by one of the motor drive channels in the event that the other becomes inoperative for any reason. In a second embodiment one of two redundant speed regulators is adapted to provide a common torque command to both channels with the other speed regulator taking over in the event of the failure of said one speed regulator. While the control may be implemented in a hardware configuration, the present invention is preferably implemented by software included in microcomputer apparatus.

BRIEF DESCRIPTION OF THE DRAWINGS

While the present invention is defined in the claims annexed to and forming a part of this specification, a better understanding can be had by reference to the following description taken in conjunction with the accompanying drawings in which:

DESCRIPTION OF THE PREFERRED EMBODIMENTS

Figure 1:
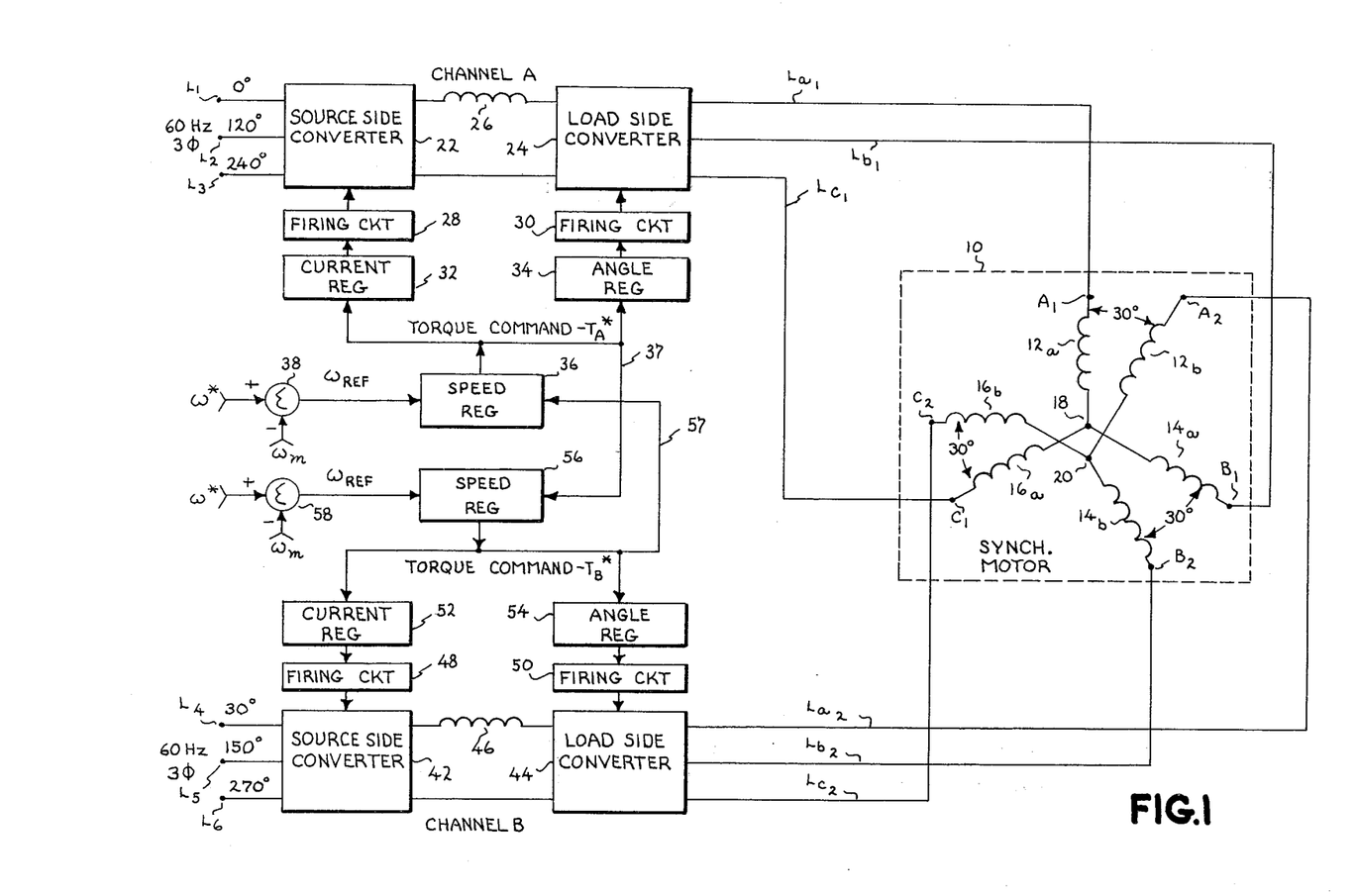
FIG. 1 is a basic block diagram illustrative of the preferred embodiment of a twelve pulse AC motor drive system in accordance with the present invention.

Prior to discussing the present invention in detail, reference to FIG. 1 is made to illustrate the main features of the subject invention as it relates to a "twelve pulse" load commutated inverter drive system coupled to a polyphase AC motor 10. The system is comprised of two "six pulse" load commutated inverter drives included in two separate three phase (3$\phi$) drive channels A and B. The motor 10 includes two sets of stator windings which are mutually displaced 30 electrical degrees. The first winding set is comprised of three windings $12_a$, $14_a$ and $16_a$ which are Y-connected at junction 18 and having end terminals $A_1$, $B_1$ and $C_1$. The other set of windings comprises the windings $12_b$, $14_b$ and $16_b$, commonly connected in a Y configuration at junction 20 and having respective end terminals of $A_2$, $B_2$ and $C_2$.

As shown in FIG. 1, motor drive channel A includes a source side converter 22 and a load side converter 24 coupled together by way of a DC link circuit including an inductor 26. The source side converter 22 is shown coupled to line terminals $L_1$, $L_2$ and $L_3$ from a 60 Hz three phase (3$\phi$) alternating current power source and wherein the relative phases of the source voltages are 0°, 120° and 240°. The source side converter 22 operates to convert the three phase AC power into a source of variable DC current which is coupled by way of the DC link circuit including the inductor 26 to the load side converter 24 which in turn operates to generate an AC current of variable magnitude and frequency which is supplied to the motor 10 by means of the three phase lines $L_{a1}$, $L_{b1}$ and $L_{c1}$. Both converters 22 and 24 are implemented by means of well known phase control thyristor bridge circuits, not shown, whose conductivity is controlled by firing control circuits 28 and 30 which are respectively controlled by the output of a current regulator 32 and firing angle regulator 34.

In a like manner, channel B includes a source side converter 42 coupled to a load side converter 44 by means of a second DC link circuit including an inductor 46. Inasmuch as the motor windings $12_b$, $14_b$ and $16_b$ lag by 30 electrical degrees the motor windings $12_a$, $14_a$ and $16_a$, the voltages applied to source side converter 42 are connected to the line terminals $L_4$, $L_5$ and $L_6$ and preferably, but not necessarily, lag the corresponding source side converter 22 voltages connected to the line terminals $L_1$, $L_2$ and $L_3$. The load side converter 44 supplies separate AC currents of variable magnitude and frequency to the motor windings $12_b$, $14_b$ and $16_b$ by way of the three phase lines $L_{a2}$, $L_{b2}$ and $L_{c2}$. The thyristors of the source side converter 42 are fired in accordance with the operation of the firing circuit 48 while the thyristors in the load side converter 44 are rendered conductive by the firing circuit 50. Again as in channel A, a current regulator 52 controls the operation of the firing circuit 48 while an angle regulator 54 controls the firing circuit 50.

Also as shown in FIG. 1, each of the drive channels A and B operate in response to its own torque command signal T* which is commonly applied to its respective current and angle regulator by separate speed regulators 36 and 56. With respect to channel A, the speed regulator 36 operates in response to a speed reference signal $\omega_{REF}$ which appears at the output of the summing junction 38. Summing junction 38 operates to provide the difference between a signal $\omega^*$, which corresponds to the desired motor speed, with a signal $\omega_M$, which corresponds to actual motor speed. Accordingly, speed regulator 36 generates a torque command signal $T^*_A$ which is commonly applied to the current regulator 32 and the angle regulator 34. This type of circuitry in its operation is generally known and is disclosed, for example, in the above mentioned reference to related application U.S. Ser. No. 343,916, entitled, "Current Limiter For A Load Commutated Inverter". In the same manner, channel B includes the speed regulator circuit 56 which operates in response to its own speed reference signal $\omega_{REF}$ developed by the summing junction 58 and which also operates to provide the difference between the speed signals $\omega^*$ and $\omega_M$.

Figure 2:
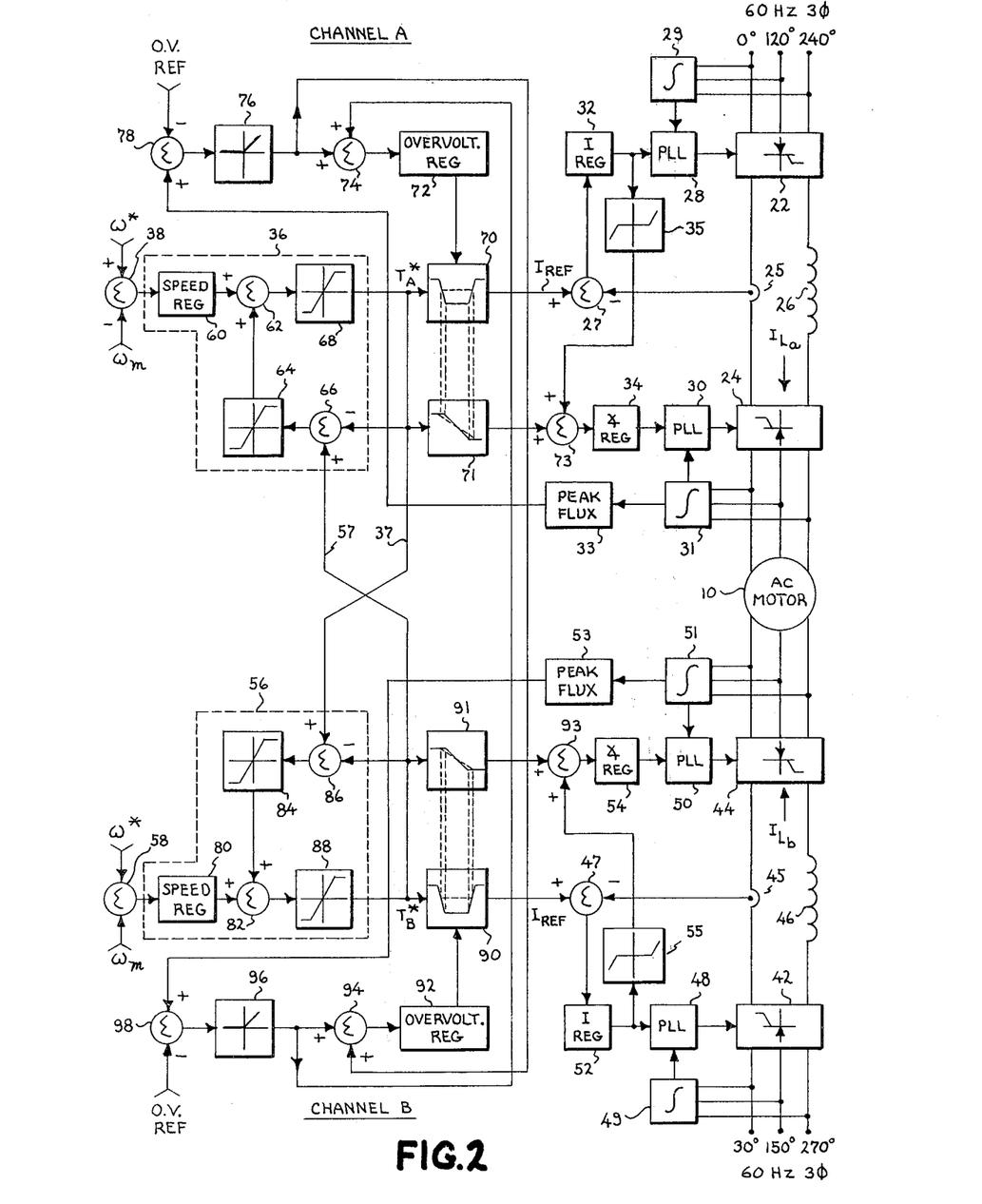
FIG. 2 is a detailed block diagram further illustrative of the embodiment shown in FIG. 1.
Figure 5:
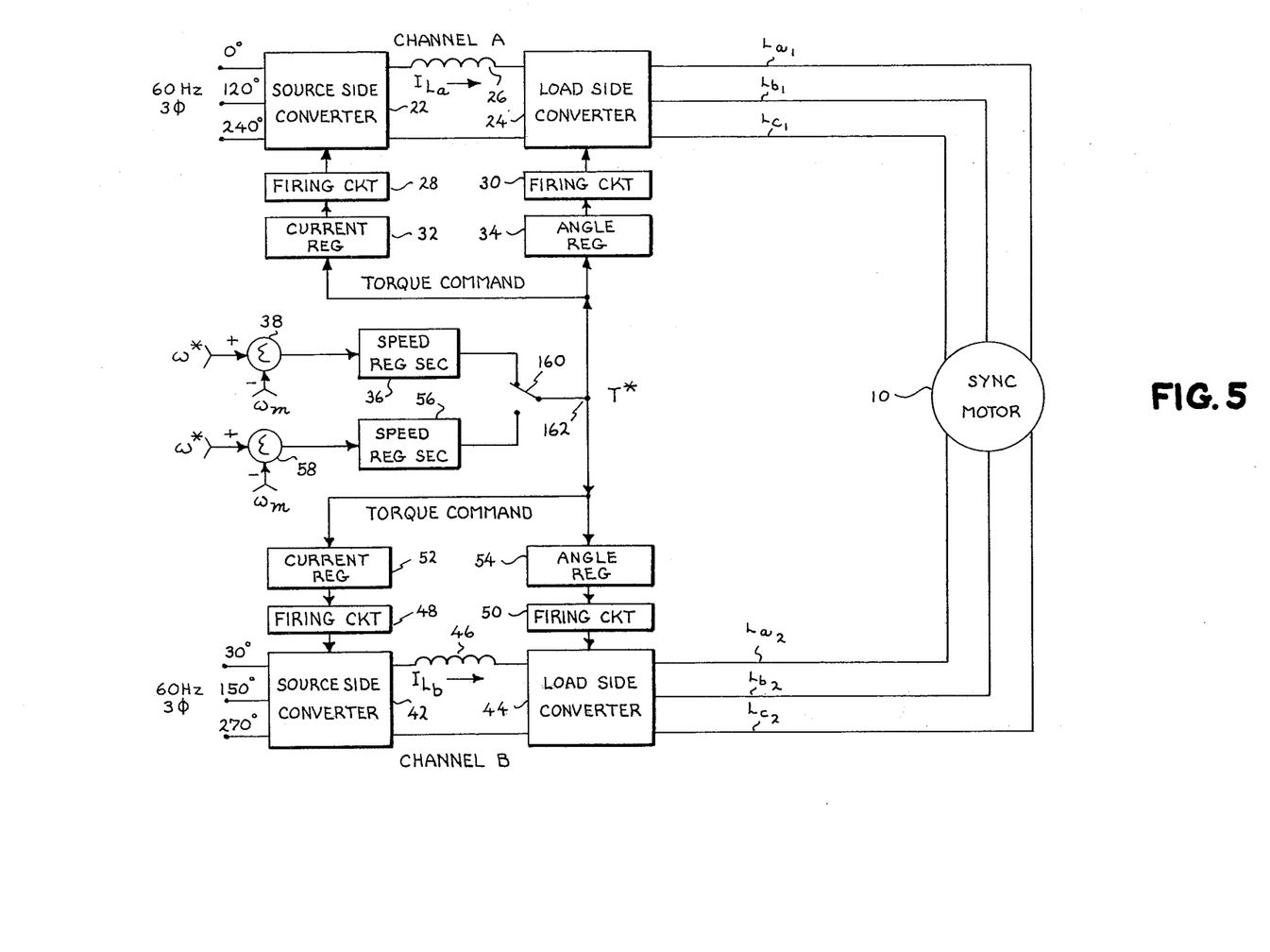
FIG. 5 is a basic block diagram illustrative of an alternative embodiment of an AC motor drive system in accordance with the subject invention.

What FIG. 1 is primarily intended to illustrate is that while two separate "six pulse" load commutated inverter drives (channels A and B), each with its own speed regulator, apply power to the motor load 10, there is nevertheless a cross coupling between the speed regulators 36 and 56 as evidenced by the signal leads 37 and 57. This coupling causes an interaction which is adapted to balance the torque command signals applied to the respective channels but, as will be shown, one channel is nevertheless able to effectively drive the motor 10 in the event that the other channel becomes inoperative. While the preferred embodiment of the invention up to this point has been disclosed in its simplest form, other additional functional elements are intended to be included such as intercoupled motor terminal voltage regulators having overvoltage regulator means. The latter will be explained when FIG. 2 is considered. An alternative embodiment is illustrated in FIG. 5 and will be considered subsequently; however, what will be disclosed there is a system in which there are two six pulse redundant drives, as shown in FIG. 1, receiving a common torque command signal from a master speed regulator located in one of the two channels. In the event of a failure in this channel, the slave speed regulator located in the other channel takes over control. The slave speed regulator while not in control was nevertheless tracking the master speed regulator such that in the event it is called into action, it does so with a bumpless transfer; i.e., without a torque disturbance into the motor drive.

Considering now the preferred embodiment of the invention in greater detail, reference is made to FIG. 2. There the motor 10 is again shown driven by the source side and load side converters 22 and 24 of channel A, as well as the source side and load side converters 42 and 44 of channel B. The firing circuits 28, 30, 48 and 50, however, are now shown consisting of phase lock loop (PLL) firing circuits which are preferably of the digital type, examples of which are typically shown and described in the above referenced U.S. Pat. No. 4,263,557, entitled, "Power Converter Control", as well as in U.S. Pat. No. 4,090,116 entitled, "Closed Loop Digital Control System And Method For Motor Control". The thyristor firing in these phase lock loop firing circuits are furthermore commutated and synchronized by the respective integrator circuits 29, 31, 49 and 51 in accordance with the teachings of the above referenced related application, U.S. Ser. No. 333,933, entitled, "Flux Feedback Firing Control For A Load Commutated Inverter" and U.S. Ser. No. 300,200, entitled, "Line-to-Line Voltage Reconstruction For Synchronizing Thyristor Power Converter".

With respect to the speed regulators 36 and 56, as shown in FIG. 2, the output of a speed regulator block 60 is coupled to one input of a summing junction 62. The other input comprises the output from a signal clamp 64 which is adapted to clamp, i.e. limit, the output of a second summing junction 66. The summing junction 66, however, is adapted to difference the magnitude of the torque command signal $T^*_A$ supplied from a limiter or signal clamp 68 in regulator 36 (channel A) and its counterpart $T^*_B$ from limiter 88 in regulator 56 (channel B). Channel B, on the other hand, includes a first summing junction 82 connected to the output of the speed regulator block 80 along with the output of a clamp 84. Summing junction 86 operates in the same manner as summing junction 66 to difference the torque command signal $T^*_B$ supplied from the limiter 88 and the limiter 68. As shown, the input polarities of the two summing junctions 68 and 88 in channels A and B, respectively, are poled (+) and (−) such that if the torque command signal from the other channel exceeds the torque command generated in the one channel, the torque command signal will increase in that one channel within the constraints provided by the respective torque limiters 68 and 88. Furthermore, the clamps 64 and 84 place an additional constraint or limit on how much of a difference in torque command between the two channels can be accounted for. This is predetermined by knowing the specific error tolerances in the speed regulator control characteristics. Furthermore, the signal clamping provided by the feedback clamps 64 and 84 limits the effect of any significant operational impairment on shut-down of the other channel and thus at least one of the channels will continue to operate to drive the motor 10 in the event of failure of the other channel.

Thus, any unbalance in the torque command signal from the other channel is coupled to and added to the magnitude of its own torque command signal to bring it into line with the other channel so that torque command signals are substantially balanced. In any event, however, the presence of the signal clamps 64 and 84 prevent any extreme deviation from a balanced condition from effecting the operation of either channel and thus can operate to power the motor 10 at least with derated operation in the event that one six pulse channel fails completely.

While not shown in the basic block diagram of FIG. 1, the preferred embodiment as shown in FIG. 2 also contemplates the inclusion of cross-coupled regulator means which become operative in the event of an increase in motor terminal voltage above a predetermined reference level whereupon control is transferred to a condition where the channel A and B DC load currents $I_{La}$ and $I_{Lb}$ in the link circuits, including the inductors 26 and 46, are used to control and balance the motor terminal voltage while the firing angles of the load side converters 24 and 44 are used to control the motor torque. This involves increasing the minimum current reference signal $I_{REF}$ in either channel for a desired torque while adjusting or shifting the firing angles of the load side converter by a change in firing strategy so that the desired torque is provided at a higher current but at a lower terminal voltage. This basic concept has been shown and described with respect to a six pulse load commutated inverter drive in the aforementioned related application U.S. Ser. No. 322,741, entitled, "Terminal Voltage Limit Regulator For A Load Commutated Inverter".

The implementation of terminal voltage regulator means in channel A includes an absolute value and minimum current limiter 70 which responds to the output of an overvoltage regulator block 72 which in turn has its input coupled to the output of summing junction 74. Summing junction 74 is adapted to receive as inputs the output from a zero limiter block 76 in channel A and a corresponding zero limiter block 96 in channel B. The input to the zero limiter block 76 comprises the differenced output from the summing junction 78 which has an overvoltage reference signal (OV REF, rescaled to volt-second units by multiplication of the overvoltage reference times motor speed) applied to its one input while its other input is coupled to a signal indicative of the magnitude of the channel A side of the motor terminal voltage. This signal is derived from an integrator circuit 31 and a peak flux wave block 33 which is responsive to the flux waves provided by the integrator circuit 31 and is adapted to generate an appropriate feedback signal to the summing junction 78. Accordingly, the overvoltage regulator 72 is responsive not only to the motor terminal voltage in channel A, but also to the motor terminal voltage of channel B. In the preferred implementation, the overvoltage reference and feedback signals are scaled in volt-second (not volt) quantities to provide a filtering of the feedback signal.

In a like fashion, an overvoltage regulator 92 in channel B controls a minimum current clamp 90 in response to the summed inputs applied to summing junction 94. As in channel A, a summing junction 98 of channel B is adapted to difference the magnitudes of an overvoltage reference (OV REF) signal applied to channel B and the magnitude of the channel B side of the motor terminal voltage derived from a peak flux wave block 53. Clamp 96 provides a positive error signal to the summing junction 94 for every non-zero positive value output from the summing junction 98. The same is true for the clamp 76 in channel A. Accordingly, the functional blocks 70 and 90 provide current reference signals $I_{REF}$ whose lower limit is varied in accordance with the magnitude of the output of the respective overvoltage regulators 72 and 92. When applied to summing junctions 27 and 47, respectively, along with the current feedback from load or motor current sensors 25 and 45, an increase in minimum current is effected. This change, however, is accompanied by a corresponding change in the operation of functional blocks 71 and 91, respectively, which implement a firing strategy for the load side converters 24 and 44 via the angle regulators 34 and 54. In the motoring mode, an increase in the lower current limit value is accompanied by a shift from a "fire as late as possible" firing strategy to one which is modified to advance the firing angle from its pre-existing condition. For a braking mode the opposite takes place. Thus both torque (motor current) and motor terminal voltage are balanced within certain constraints.

The embodiment of FIG. 2 additionally shows the inclusion of a pair of regulators 35 and 55 in channels A and B respectively coupled between the outputs of the current regulators 32 and 52 and the inputs to the angle regulators 34 and 54 via summing junctions 73 and 93. The regulators 35 and 55 comprise cross-tie regulators which operate to switch control of the currents $I_{La}$ and $I_{Lb}$ in the DC link circuit from the source side converters 22 and 42 to the load side converters 24 and 44 depending upon which converters are capable of regulating it. The effect of the switch in control to the load side converters is to modify the load side firing angle in a manner to regulate link current at or near the current reference level. This concept is set forth in greater detail in the above referenced related application U.S. Ser. No. 333,924, entitled, "Cross-Tied Current Regulator For Load Commutated Inverter Drives".

Figure 3:
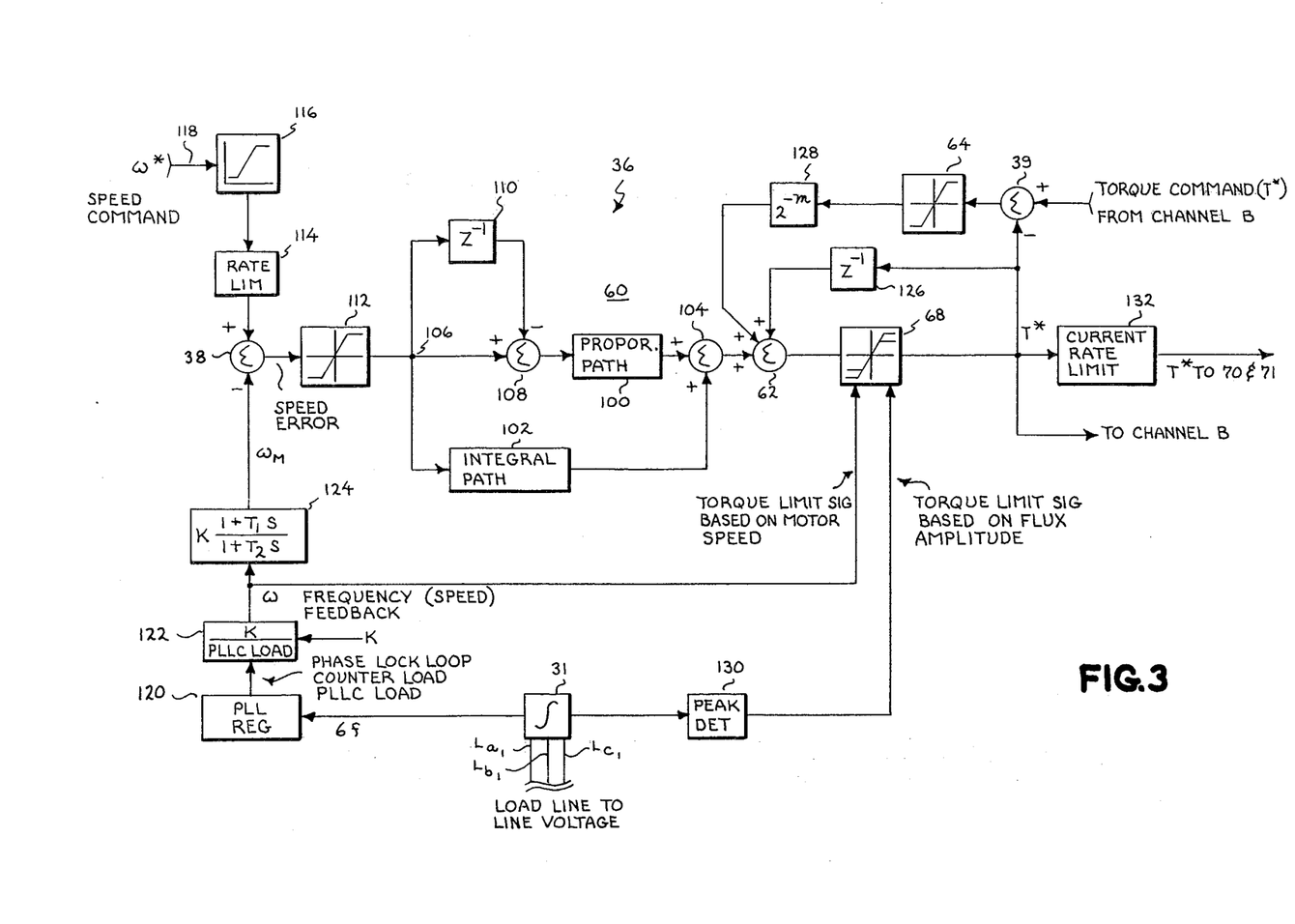
FIG. 3 is a detailed block diagram further illustrative of the speed regulator for one channel of the motor drive system shown in FIG. 2.

Considering further the speed regulator portions of the subject invention, FIG. 3 is intended to illustrate in greater detail the speed regulator 36 of channel A, it being understood that it is implemented functionally in software contained in an Intel 8086 microprocessor programmed in PLM language and including self-contained instructional code sets or programs stored in a memory and that the same elements are included in the corresponding speed regulator 56 of channel B.

To this end FIG. 3 discloses a proportional plus integral speed regulator circuit 60 including a proportional path 100 and an integral path 102, the outputs of which are connected to summing junction 104. The input to the proportional path 100 comprises the difference between a limited speed error signal appearing at circuit node 106, which is coupled to one input (+) of a summing junction 108, and a unit delay signal block 110 whose output feeds into the other (−) input of the summing junction 108. As shown in FIG. 1, the speed error signal $\omega_{REF}$ is provided at the output of a summing junction 38; however, in FIG. 3 it is shown coupled to circuit junction 106 through a limiter 112. Additionally, as shown, one input (+) to summing junction 38 comprises the output of a rate limit block 114 which is coupled to a limiter 116, the latter being adapted to balance the minimum and maximum magnitudes of the set points for the desired motor speed $\omega^*$ applied to signal lead 118. The other input (−) to the summing junction 38 comprises a signal corresponding to the actual motor speed $\omega$.

The motor speed signal $\omega$ is derived from a software implemented phase lock loop regulator 120 which is synchronized to the motor fundamental frequency as derived from load side flux waves zero crossings of pseudo-flux waveforms generated in the integrator 31. These waveforms are generated, for example, according to the concepts disclosed in the aforementioned related application U.S. Ser. No. 300,200, entitled, "Line-to-Line Voltage Reconstruction For Synchronizing Thyristor Power Converter". The phase lock loop regulator 120 will produce an output value whose frequency is proportional to motor speed. Accordingly, a predetermined constant in a divider circuit 122 is divided by the count loaded into the phase locked loop counter and passed through a leadlag filter network having a transfer characteristic defined as:
$K(1+T_1S/1+T_2S)$ wherein:
K is the DC gain of the filter network,
$T_1$ is the lead time constant,
$T_2$ is the lag time constant, and,
S is Laplace transform operator.
This filter is used to stabilize the speed regulator response.

Proceeding now to the output of the speed regulator 36, although the summing junction 62 and the torque limiter block 68 was previously illustrated in FIG. 2, along with the summing junction 66 and the clamp 64, the block diagram in FIG. 3 additionally shows the inclusion of a unit delay block 126 coupled between the output of the torque limiter block 68 and one input of the summing junction 62 as well as a $2^{-m}$ scaling block 128 which is adapted to adjust the gain of the feedback signal fed to the summing junctions 62 from summing junction 39. The torque limiter block 68, moreover, is shown to have two control inputs for varying the limits of the torque command output signal $T^*$. One control input consists of a frequency feedback signal which as noted is proportional to the motor speed $\omega$. The other control input comprises a signal corresponding to the peak value of the pseudo-flux waveforms provided by the integrator 31. As shown in FIG. 3, this comprises a peak detector circuit 130 coupled from the integrator 31 to the torque limiter block 68. The control of the torque limiter 68 is analogous to the teachings set forth in the above referenced related application, U.S. Ser. No. 343,916 entitled, "Current Limiter For A Load Commutated Inverter". Accordingly, the output of the torque limiter 68 comprises a torque reference or command signal $T^*$. However, before it is applied to the current and angle regulator circuitry shown in FIG. 2, it is first applied to a current rate limiter block 132 whose output is coupled to the block 70 and 71 shown in FIG. 2.

Figure 4:
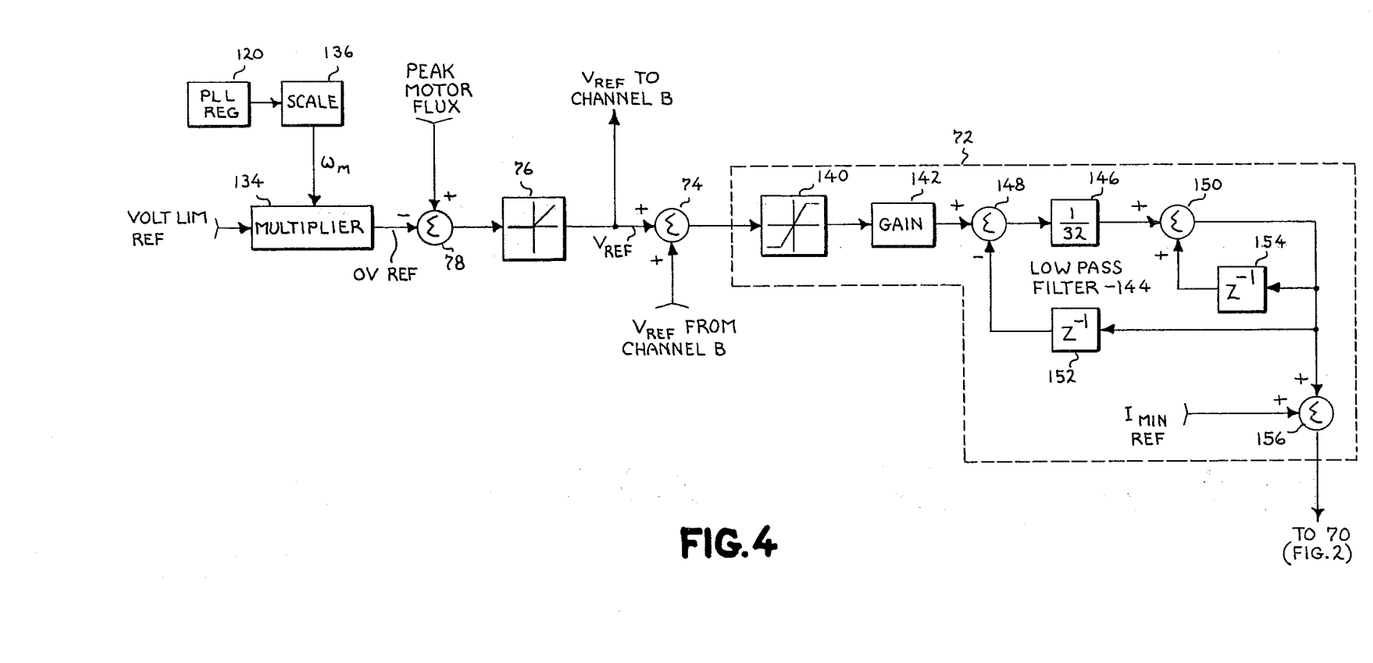
FIG. 4 is a detailed block diagram further illustrative of the terminal overvoltage regulator for one channel of the motor drive system shown in FIG. 2.

Referring now to the block diagram of FIG. 4, there is illustrated in greater detail that portion of the motor terminal voltage regulator means shown in FIG. 2 which includes the overvoltage regulator 72 included in channel A. This is duplicated in channel B and as in the case of the speed regulators, both are implemented in software as aforementioned. As shown, the overvoltage reference signal (OV REF) is applied to the negative (−) input of summing junction 78. This reference signal, however, is developed from a digitized voltage limiter reference signal which is applied to a multiplier 134 which also receives as an input a scaled value of the output count of the phase lock loop counter 120. The scaling is provided by the gain functional block 136. The purpose of this is to provide units of measurement consistent with the peak flux wave signal applied to the plus (+) input of summing junction. If the actual peak flux signal exceeds the rescaled overvoltage reference (OV REF), a positive signal $V_{REF}$ is provided from the limiter circuit 76. A zero output is provided for any negative output of the summing junction 78. The output of the limiter 76 is next applied to summing junction 74 which also receives as an input the $V_{REF}$ counterpart from channel B. The output from the summing junction 74 in effect comprises the average of the voltage reference $V_{REF}$ signals from both channels. If, however, the other channel, for example channel B fails, the summing junction 74 nevertheless delivers the input from channel A.

The overvoltage regulator 72 of FIG. 4 is shown consisting of a limiter 140 and a gain functional block 142, the latter being adapted to sense a channel failure and maintain a constant gain in the signal path in that event. The output of the gain functional block 142 is next passed through a low pass filter 144 which consists in a discrete domain digital type filter shown schematically as a scaling block 146 connected between summing junctions 148 and 150 with a unit delay block 152 being coupled back to one input (−) of summing junction 148 and a second unit delay block 154 coupled between the output of the summing junction 150 and one of its positive (+) inputs. The output of the low pass filter 144 is summed with a minimum current reference signal at summing junction 156 with the resultant being applied to the motor current limiter block 70 shown in FIG. 2 which operates to keep the motor terminal voltage less than the motor voltage limit. The current minimum reference signal applied to summing junction 156 sets the minimum current setting while the output of the low pass filter 144 acts to raise the minimum current level as required. Thus, since the overvoltage regulator 72 is downstream of the torque balance connection provided by the cross coupling of the speed regulators, it is possible to provide a further current balance with the cross coupling of the motor terminal limiter which include the overvoltage regulators.

While the present invention thus far has been illustrated in terms of two six pulse channels, the torque and balance concepts set forth herein can be extended to any number (n) of six pulse channels by a modification wherein the torque command cross coupled to any one channel is the average of the other n−1 torque commands. Similarly, the overvoltage reference signal cross coupled to any one channel would be made the average of the other n−1 voltage regulator error signals.

While the foregoing comprises the preferred embodiment of the invention, an alternative embodiment is shown in FIG. 5. There the implementation of the six pulse load commutated inverter drives of channel A and B coupled to the AC synchronous motor 10 is substantially identical to that shown in FIG. 1 but with a significant difference. The difference lies in the way in which the two speed regulators 36 and 56 are utilized. Whereas in the embodiment shown in FIG. 1 the speed regulator sections are cross coupled and operate concurrently with one another to provide a substantially balanced torque command signal in both channels, in the embodiment of FIG. 5 the two speed regulators 36 and 56 are alternately operable to individually generate the same torque command signals for both channels. Moreover, the speed regulator 36 is adapted to be the primary means of providing the torque command signal to both channels while speed regulator 56 is an alternative or back-up unit which is brought on line in the event of failure in the other six pulse channel. To that end, the speed regulators 36 and 56 are shown having their respective outputs coupled to a switch 160 which normally connects the output of speed regulator 36 to circuit junction 162 which is adapted to feed the same torque command signal T* to both current regulators 32 and 52 and both angle regulators 34 and 54. The switch 160 although shown as a single-pole, double-throw switch, is actually implemented in software and is adapted to monitor any failure in the channel containing the master speed regulator 36 and switch to the slave regulator 54 automatically.

While there have been shown and described what are at present considered to be the preferred embodiments of the invention, modifications thereto will readily occur to those skilled in the art. For example, while in the preferred embodiment illustrated the motor windings and source voltages have been phase displaced to reduce harmonics, the present invention would be applicable to multiple channel drives without such phase displacement. It is not desired, therefore, that the invention be limited to the specific implementations shown and described, but it is intended to cover all such modifications, changes and alterations as fall within the true spirit and scope of the invention as defined in the appended claims.

1. A system for controlling power supplied to an AC load from an AC source, comprising:
   (a) at least two substantially identical supply channels separately coupled in parallel to said load, each of said supply channels including an AC to DC source side converter coupled from an AC source to a DC to AC load side converter via a DC link circuit, and wherein said load side converter of each channel supplies respective AC power of varying magnitude and frequency to said load;
   (b) a channel control means, associated with each of said supply channels, capable of controlling the operation of the associated one of said supply channels;
   (c) means for cross coupling said channel control means for balancing the operation of said supply channels; and,
   (d) means for limiting the effect of said cross-coupling whereby in the event of failure of a one of said supply channels, any remaining channels will continue to supply power to the load.

2. The system as defined by claim 1 wherein said load comprises an AC motor.

3. The system as defined by claim 2 wherein said AC source comprises a polyphase AC source and said motor comprises a polyphase synchronous motor.

4. The system as defined by claim 3 wherein said polyphase motor includes at least two sets of windings, and
   wherein said at least two supply channels are respectively coupled to separate sets of said at least two sets of windings by means of respective load side converters.

5. The system as defined by claim 2 wherein said channel control means comprises means for controlling the torque of said motor.

6. The system as defined by claim 5 wherein said means for controlling the torque includes means for generating a torque command signal in response to a desired motor speed.

7. The system as defined by claim 6 wherein said at least two channel control means (b) are cross-coupled and are operable concurrently to control a respective channel of said supply channels by individually generated torque command signals applied thereto from said channel control means.

8. The system as defined by claim 7 wherein both said at least two channel control means (b) include speed regulator means responsive to signals corresponding to desired motor speed and actual motor speed and being operable to generate respective torque command signals.

9. The system as defined by claim 7 wherein each said channel control means (b) includes,
(i) speed regulator means operable to generate a torque command signal, and
(ii) means for combining a torque command signal generated therein with a like signal cross-coupled from the other channel control means to provide a composite torque command signal which is adapted to increase or decrease in magnitude in the event said like signal from the other channel control means exceeds or is less than the torque command signal generated therein but having a magnitude substantially corresponding to said torque command signal generated therein in the event of failure of the other channel.

10. The system as defined by claim 9 wherein said converters are comprised of thyristor converters and additionally including respective current regulator means for controlling the source side converters and respective angle regulator means for controlling the load side converters and wherein the composite torque command signal from each channel control means is commonly connected to current regulator means and angle regulator means of a respective supply channel, said current regulator means being adapted to control the current in said DC link circuit and said angle regulator means being operable to control the thyristor firing angles of said load side converter.

11. The system as defined by claim 10 wherein said like signal from the other channel control means comprises a composite torque command generated in said other channel control means and wherein said combining means (ii) includes,
(1) first signal summing means for comparing the composite torque command signals of both channel control means and providing a difference signal therebetween and
(2) second signal summing means for summing said torque command signal generated therein with said difference signal to provide a respective composite signal.

12. The system as defined by claim 11 and wherein said combining means (ii) additionally includes,
(3) difference signal limiter means coupled between said first and second summing means and,
(4) composite torque command signal limiter means coupled from said second signal summing means to both said supply channels for limiting the magnitude of the respective composite torque command signal outputted therefrom.

13. The system as defined by claim 12 and wherein said composite torque command signal limiter means coupled from said second summing means has a signal limiting characteristic controlled in accordance with the magnitude of the integrated motor terminal voltage.

14. The system as defined by claim 12 wherein said composite torque command limiter means coupled from said second signal summing means has a signal limiter characteristic variable in accordance with motor speed.

15. The system as defined by claim 10 and additionally including,
(iii) respective motor terminal voltage limit regulator means for said at least two supply channels, said terminal voltage regulator means being cross-coupled and operable concurrently to further control a respective channel of said supply channels for further effecting a balanced operation of said supply channels.

16. The system as defined by claim 15 wherein each motor terminal voltage limit regulator means (iii) includes,
(1) first summing means for comparing a signal corresponding to a first voltage reference signal and a signal corresponding to the motor terminal voltage of the respective supply channel and providing a difference signal of a second voltage reference signal, and
(2) second summing means for comparing the second voltage reference signals of both supply channels and providing a composite voltage reference signal therefrom, said composite voltage reference signal being operable to alter the operation of the respective current regulator means and angle regulator means by effecting an increase in the minimum motor load current in the respective said DC link circuit for a desired motor torque while shifting the thyristor firing angles of the respective load side converter of the respective supply channel by a predetermined change in firing strategy so that the desired motor torque is provided at a higher motor load current but at a lower terminal voltage.

17. The system as defined by claim 16 wherein said motor terminal voltage limit regulator means additionally includes,
(3) overvoltage regulator means coupled between said second summing means and the respective current regulator means.

18. The system as defined by claim 17 and additionally including,
(4) voltage reference signal limiter means coupled between said first and second comparator means, and wherein said voltage reference signal limiter means are adapted to provide an output for non-zero values of input signals of a predetermined polarity while outputting substantially zero amplitude signals for non-zero values of the opposite polarity.

19. The system as defined by claim 17 wherein said overvoltage regulator means (3) includes,
signal limiter means coupled to low pass filter means for selectively processing said composite voltage reference signal, and
signal summing means for summing a motor load current minimum reference signal with the processed voltage reference signal to provide a control signal for the current regulator means in the respective supply channel for controlling the minimum motor load current in the DC link circuit and the firing strategy of the respective load side converter.

20. A method of controlling an AC load by a plurality of AC to DC source side converters coupled from an AC source to respective DC to AC load side converters via respective DC link circuits, comprising the steps of:
- (a) arranging said converters and respective link circuits in at least two separate drive channels which are coupled to and supply AC power separately to said load;
- (b) generating at least one operational control signal in each of said drive channels in response to a desired operational parameter of the load;
- (c) applying said at least one operational control signal generated in a drive channel to its respective drive channel;
- (d) effecting balanced operation of both said drive channels by cross coupling between drive channels the respectively generated operational control signals; and
- (e) limiting the effect of said cross coupling whereby, in the event of failure of a one of said drive channels, any remaining drive channel will continue to supply power to the load.

21. The method as defined by claim 20 wherein said load comprises an AC motor.

22. The method as defined by claim 21 wherein said operational control signal comprises a torque command signal.

23. The method as defined by claim 22 wherein said AC motor comprises a polyphase synchronous motor including at least two sets of motor windings and wherein two drive channels are provided, one of which is connected to one set of motor windings and the other of which is connected to the other set of motor windings.

24. The method as defined by claim 23 wherein said generating step (b) comprises,
- (i) generating two operational control signals of a like type,
- (ii) cross-coupling said control signals and generating two composite control signals therefrom, and
- (iii) applying said two composite signals to respective channels for concurrently operating both channels in a balanced operational mode.

* * * * *